(12) United States Patent
Iwaji et al.

(10) Patent No.: US 11,139,771 B2
(45) Date of Patent: Oct. 5, 2021

(54) CONTROL DEVICE AND CONTROL METHOD FOR AC MOTOR AND AC MOTOR DRIVE SYSTEM

(71) Applicant: HITACHI AUTOMOTIVE SYSTEMS, LTD., Hitachinaka (JP)

(72) Inventors: Yoshitaka Iwaji, Tokyo (JP); Naoki Okamoto, Hitachinaka (JP); Masaki Hano, Hitachinaka (JP); Takeshi Umetsu, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 250 days.

(21) Appl. No.: 16/337,781

(22) PCT Filed: Sep. 25, 2017

(86) PCT No.: PCT/JP2017/034454
§ 371 (c)(1),
(2) Date: Mar. 28, 2019

(87) PCT Pub. No.: WO2018/070224
PCT Pub. Date: Apr. 19, 2018

(65) Prior Publication Data
US 2019/0253014 A1    Aug. 15, 2019

(30) Foreign Application Priority Data
Oct. 11, 2016 (JP) .............................. JP2016-199851

(51) Int. Cl.
*H02P 27/08* (2006.01)
*F04B 17/03* (2006.01)
*H02M 7/48* (2007.01)

(52) U.S. Cl.
CPC ............ *H02P 27/085* (2013.01); *F04B 17/03* (2013.01); *H02M 7/48* (2013.01); *H02P 27/08* (2013.01)

(58) Field of Classification Search
CPC .......... H02P 27/085; H02P 27/08; H02P 1/00; H02P 1/04; H02P 1/46; H02P 3/00;
(Continued)

(56) References Cited

U.S. PATENT DOCUMENTS 5,790,396 A * 8/1998 Miyazaki .............. H02M 7/487
363/96
8,174,221 B2 * 5/2012 Kaneko ................... B60L 50/16
318/400.09

(Continued)

FOREIGN PATENT DOCUMENTS

JP      07-194130 A     7/1995
JP      2002-325498 A   11/2002
(Continued)

OTHER PUBLICATIONS

International Search Report, PCT/JP2017/034454, 1 pg.
(Continued)

*Primary Examiner* — Antony M Paul
(74) *Attorney, Agent, or Firm* — Volpe Koenig

(57) ABSTRACT

To enable overmodulation control having high controllability and low noise characteristics, a control device of an AC motor includes an inverter for driving an AC motor and a controller for controlling the inverter by pulse width modulation. The controller, when over-modulating the inverter, limits the amplitude of the voltage command in the pulse width modulation to a predetermined upper limit value or less.

12 Claims, 11 Drawing Sheets

(58) Field of Classification Search
CPC ...... H02P 21/00; H02P 21/2013; H02P 27/00; H02P 27/04; H02P 27/06; F04B 17/03; G05B 11/28
See application file for complete search history.

(56) References Cited

U.S. PATENT DOCUMENTS

| | | | | |
|---|---|---|---|---|
| 8,502,493 | B2* | 8/2013 | Suhama | ............ H02P 27/08 |
| | | | | 318/798 |
| 9,407,181 | B2* | 8/2016 | Furukawa | ............ H02P 6/28 |
| 9,515,583 | B2* | 12/2016 | Suhama | ............ H02P 27/08 |
| 9,647,575 | B2* | 5/2017 | Yamasaki | ............ H02P 27/00 |
| 9,829,234 | B2* | 11/2017 | Hatakeyama | ......... H02P 29/62 |
| 9,903,629 | B2* | 2/2018 | Kamiya | ............ F24F 1/20 |
| 2010/0127656 | A1* | 5/2010 | Ohtani | ............ H02P 21/06 |
| | | | | 318/811 |

FOREIGN PATENT DOCUMENTS

| | | | |
|---|---|---|---|
| JP | 2007-028847 A | 2/2007 | |
| JP | 5002343 B2 | 8/2012 | |
| JP | 2013055852 A | * 3/2013 | ............ H02P 21/00 |
| JP | 2014-093820 A | 5/2014 | |
| JP | 2014-195391 A | 10/2014 | |
| JP | 5984991 B1 | 9/2016 | |
| JP | 2016-197933 A | 11/2016 | |

OTHER PUBLICATIONS

Extended European Search Report dated Apr. 6, 2020 for the European Patent Application No. 17860920.2.

Pinto et al., "A neural-network-based space-vector PWM controller for voltage-fed inverter induction motor drive," in IEEE Transactions on Industry Applications, vol. 36, No. 6, pp. 1628-1636, (Nov.-Dec. 2000).

Yue et al., "A Novel Naturally Sampled Space Vector Pulse Width Modulation Algorithm," 2009 Workshop International on Intelligent Systems and Applications, Wuhan, pp. 1-5. (2009).

Vasilios et al., "A novel SVPWM Overmodulation technique based on voltage correcting function," 2012 3rd IEEE International Symposium on Power Electronics for Distributed Generation Systems (PEDG), Aalborg, pp. 682-689 (2012).

Japanese Office Action dated Apr. 28, 2020 for the Japanese Patent Application No. 2016-199851.

* cited by examiner fc=12kHz/f1=175Hz

Kh =1.95

Kh =3.90
(LIMITING POINT: FORMULA (7))

Kh =5.0 fc=1.61kHz/f1=175Hz

ND CONTROL
CONTROL DEVICE AND CONTROL METHOD FOR AC MOTOR AND AC MOTOR DRIVE SYSTEM

TECHNICAL FIELD

The present invention relates to a control device and control method for an AC motor that perform overmodulation control of an inverter for driving the AC motor, and to an AC motor drive system.

BACKGROUND ART

In the fields of home appliances, industries, automobiles, etc., motor drive devices are used for rotational speed control of fans, pumps and compressors, positioning control of conveyors and elevators, torque control of electric power steering, and the like. A permanent magnet type synchronous motor (hereinafter referred to as "PM motor"), which is a compact and highly efficient AC motor, is widely used in motor drive devices in these fields.

In the PM motor, the magnetic flux necessary for generating the torque is generated by the magnetic flux of the permanent magnet attached to the rotor. This eliminates the need for a current for generating the magnetic flux and greatly improves the copper loss, so the PM motor has high efficiency.

By more effectively utilizing the magnetic flux of the permanent magnet, the efficiency of the PM motor is further improved. However, when attempting to effectively utilize the magnetic flux of the permanent magnet, the induced voltage (speed electromotive voltage) of the PM motor increases at the same time. This induced voltage occurs in principle by the magnetic flux of the permanent magnet linking with the stator coil. Therefore, in order to efficiently drive the PM motor, it is desirable to use an inverter capable of outputting a voltage as high as possible.

However, the magnitude of the fundamental wave voltage that the inverter can output is limited by the DC power supply voltage. Particularly in the case of using vector control which is a high-performance control method, it is preferable that the inverter is driven with a sinusoidal voltage command, and in that case, the maximum output voltage (fundamental wave voltage) of the inverter becomes $E_{DC}$ with respect to the DC power supply voltage $E_{DC}$.

The maximum output voltage of the inverter can be made larger than $E_{DC}$ by so-called overmodulation control. In this overmodulation control, the pulse width of the PWM pulse is widened in the vicinity of the peak value of the voltage command (modulated wave signal). Therefore, in a state where the largest voltage is output by overmodulation, the output voltage waveform of the inverter becomes a rectangular wave. By such overmodulation control, effectively, the magnitude of the fundamental wave voltage can be increased by about 10 to 20% with respect to the $E_{DC}$.

Techniques described in PTLs 1, 2, and 3 are known as conventional techniques related to the overmodulation control described above.

In the technique described in PTL 1, in the overmodulation control in the asynchronous PWM control, the modulation rate is changed nonlinearly with respect to the output voltage command of the inverter. As a result, the output voltage of the inverter can be linearly controlled with respect to the output voltage command.

In the technique described in PTL 2, in the overmodulation control in the synchronous PWM control, a d-axis voltage command and a q-axis voltage command are corrected according to the number of synchronizations, which is the number of triangular wave carriers per cycle of the phase voltage command. Thereby, the fundamental wave amplitude of the pulse width modulation voltage can be controlled according to the voltage command amplitude without causing a beat phenomenon.

In the technique described in PTL 3, when switching the inverter from the current control (PWM modulation control) to the voltage control (rectangular wave control), the integral term of the integral current control system is converged to zero and the integral current control is stopped, and the inverter is switched to proportional voltage control using a proportional term. As a result, it is possible to smoothly switch from the PWM modulation control to the rectangular wave control.

CITATION LIST

Patent Literature

PTL 1: JP H7-194130 A
PTL 2: JP 5002343 B2
PTL 3: JP 2002-325498 A

SUMMARY OF INVENTION

Technical Problem

In the conventional technique of PTL 1, when the number of triangular wave carriers per cycle of the output voltage command of the inverter decreases, the fundamental wave voltage corresponding to the voltage command cannot be obtained and the controllability deteriorates. Also, with the asynchronous PWM control, a beat phenomenon may occur.

In the conventional technique of PTL 2, although the beat phenomenon can be avoided by the synchronous PWM control, the frequency of the carrier signal is switched so that the cycle of the voltage command signal is an integral multiple of the cycle of the carrier signal with respect to the fundamental frequency. For this reason, a change in electromagnetic noise caused by frequency switching of the carrier signal may cause discomfort. In addition, since the carrier frequency and the current control cycle are linked, the degree of freedom in setting the control response is limited. For this reason, controllability deteriorates. Also, when switching the ratio between carrier frequency and fundamental frequency, torque shock may occur.

In the conventional technique of PTL 3, the responsiveness of the current control system is lowered, and stability in control is lowered in applications in which the case where voltage limitation is applied and the case where it is not applied are repeated.

Therefore, the present invention provides a control device for an AC motor capable of overmodulation control having high controllability and low noise characteristics.

Solution to Problem

In order to solve the above problems, a control device for an AC motor according to the present invention includes an inverter for driving an AC motor and a controller for controlling the inverter by pulse width modulation, wherein the controller limits an amplitude of a voltage command in the pulse width modulation to a predetermined upper limit value or less when performing overmodulation control of the inverter.

In addition, in order to solve the above problems, a control method for an AC motor according to the present invention controls an inverter that drives the AC motor by pulse width modulation, and limits an amplitude of a voltage command in the pulse width modulation to a predetermined upper limit value or less when performing overmodulation control of the inverter.

In addition, in order to solve the above problems, an AC motor drive system according to the present invention includes an AC motor for driving a load, an inverter for driving the AC motor, and a controller for controlling the inverter by pulse width modulation, wherein the controller limits an amplitude of a voltage command in the pulse width modulation to a predetermined upper limit value or less when performing overmodulation control of the inverter.

Advantageous Effects of Invention

According to the present invention, by limiting the amplitude of the voltage command in the pulse width modulation to a predetermined upper limit value or less when performing overmodulation control of the inverter, overmodulation control having high controllability and low noise characteristics becomes possible.

The problems, configurations, and effects other than those described above will be clarified from the description of the embodiments below.

DESCRIPTION OF EMBODIMENTS

Figure 1:
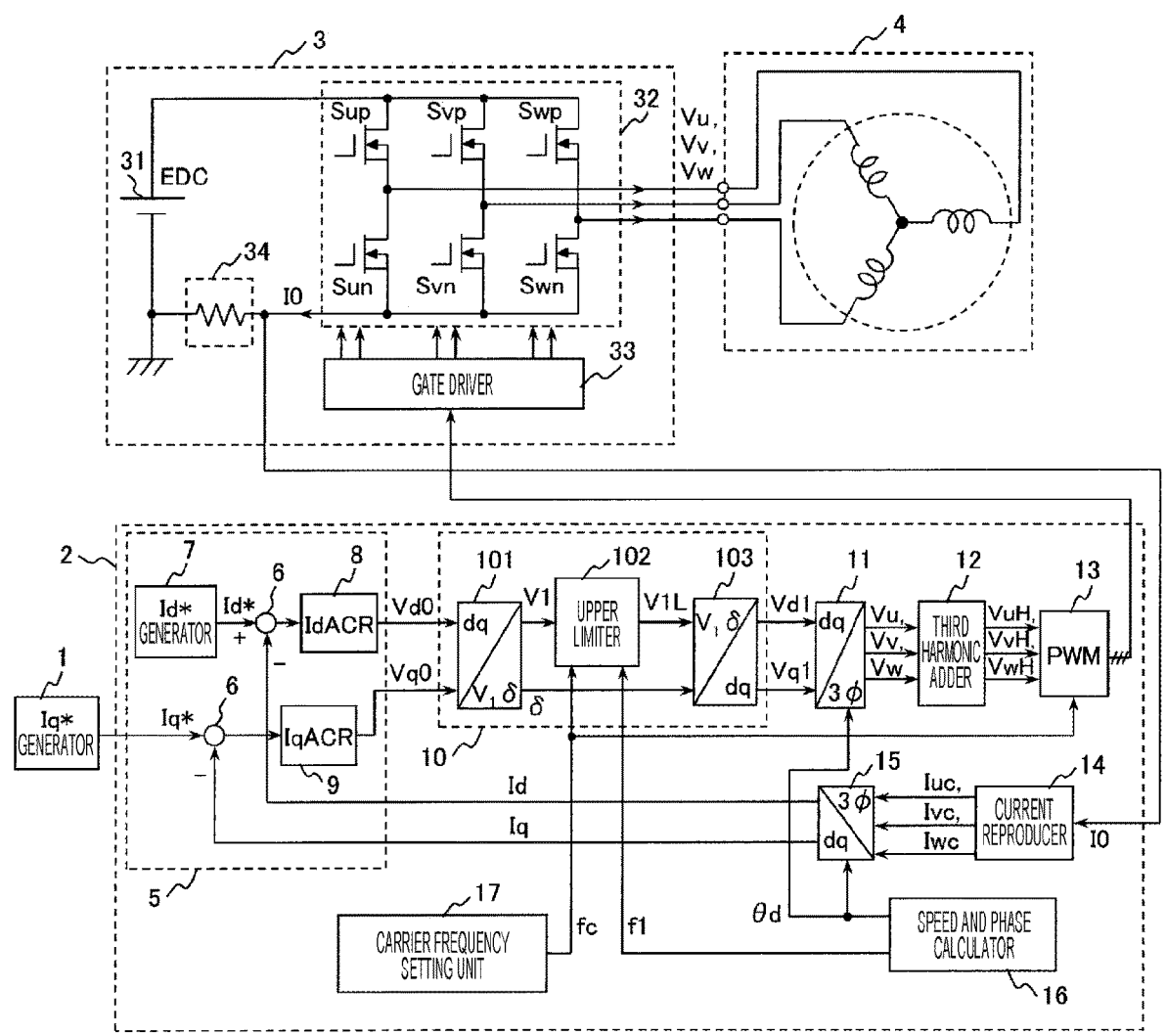
FIG. 1 shows a configuration of a control device for an AC motor according to a first embodiment.

Hereinafter, embodiments of the present invention will be described with reference to the drawings. In each figure, those having the same reference numerals indicate the same constituent elements or constituent elements having similar functions.

First Embodiment

The first embodiment of the present invention will be described with reference to FIGS. 1 to 8.

FIG. 1 shows a configuration of a control device for an AC motor according to the first embodiment of the present invention.

As shown in FIG. 1, the present embodiment includes an inverter 3 that applies three-phase AC power to a three-phase permanent magnet synchronous motor (hereinafter abbreviated as "PM motor") 4 to drive the PM motor 4, and a controller 2 that controls the inverter 3 based on the torque current command Iq* output from an Iq* generator 1. The inverter 3 has a DC power supply 31 and an inverter main circuit 32 that converts the DC power of the DC power supply 31 into three-phase AC power and outputs it to the PM motor 4.

When the three phase voltages Vu, Vv, Vw output from the inverter are applied, the PM motor 4 is rotationally driven by the magnetic force between the rotating magnetic field generated by the stator winding and the permanent magnet of the rotor.

In the present embodiment, the AC motor to be driven is a PM motor, but it is not limited to this, and other kinds of AC motors, for example, an induction motor and a winding field type synchronous motor may be used.

The inverter main circuit 32 is constituted by a three-phase bridge circuit including six semiconductor switching elements Sup, Sun, Svp, Svn, Swp and Swn (MOSFET in FIG. 1). These six semiconductor switching elements are on/off-controlled by a gate drive signal output from a gate driver 33 of the inverter 3 in accordance with the control signal generated by the controller 2, whereby the DC power of the DC power supply 31 is converted into three-phase AC power. The controller 2 executes current control based on a current detector 34 provided in the inverter 3, for example, the DC bus current I0 detected by the shunt resistance.

The Iq* generator 1 generates the torque current command Iq* of the PM motor 4, and it corresponds to the upper controller of the controller 2. For example, the Iq* generator 1 functions as a speed controller that controls the rotation speed of the PM motor 4, and functions as a torque controller that controls the torque of the PM motor 4 according to the state of the load device such as a pump.

The controller 2 executes vector control of the PM motor 4. The controller 2 includes a current control unit 5 for controlling a torque current Iq and an excitation current Id, a voltage limiting unit 10 for limiting the voltage commands Vd0, Vq0 on the dq coordinates output from the current control unit 5, a dq inverse converter 11 for converting voltage-limited voltage commands Vd1, Vq1 on the dq coordinates into the three-phase AC voltage commands Vu, Vv, Vw, a third harmonic adder 12 for adding third harmonics to the three-phase AC voltage commands Vu, Vv, Vw to improve a voltage utilization factor, a pulse width modulator (PWM) 13 for generating, by pulse width modulation (PWM), a gate pulse signal that drives the inverter 3 based on the outputs VuH, VvH, VwH of the third harmonic adder 12, a current reproducer 14 for reproducing three-phase AC currents Iuc, Ivc, Iwc from the DC bus current I0 of the inverter 3, a dq converter 15 for converting the reproduced three-phase AC currents Iuc, Ivc, Iwc into values Id, Iq of the dq coordinate axes which are the rotor coordinate axes of the PM motor 4, a speed and phase calculator 16 for calculating a rotational speed and a rotational phase angle of the PM motor 4, and a carrier frequency setting unit 17 for setting a carrier frequency fc in performing pulse width modulation.

The current control unit 5 includes a signal adder 6, an Id* generator 7 for giving an excitation current command Id* to the PM motor 4, a d-axis current controller (IdACR) 8 for controlling an excitation current (d-axis current), and a q-axis current controller (IqACR) 9 for controlling the torque current (q-axis current). The d-axis current controller (IdACR) 8 in the current control unit 5 generates a d-axis voltage command Vd0 so that the difference between the d-axis current command Id* and the d-axis current value Id becomes zero, that is, the Id approaches the Id*. The q-axis current controller (IqACR) 9 in the current control unit 5 generates a q-axis voltage command Vq0 so that the difference between the q-axis current command Iq* and the q-axis current value Iq becomes zero, that is, the Iq approaches the Iq*.

In the present embodiment, the phase current of the PM motor 4 is detected such that the DC bus current I0 is detected by the current detector 34 and the phase current is reproduced by the current reproducer 14 inside the controller 2, but the phase current may be directly detected using a phase-current sensor. In the current reproducer 14, a known one-shunt method is applied. The speed and phase calculator 16 is a processing unit of a sensor signal when a rotational phase and speed sensor is used, and is a position and speed estimating unit in the case of a position and speed sensorless.

Next, the operation of the voltage limiting unit 10, which is one feature of the present embodiment, will be described.

The voltage limiting unit 10 includes a polar coordinate converter 101 for converting the dq-axes voltage commands Vd0 and Vq0 into an amplitude V1 and a phase δ in the polar coordinates, an upper limiter 102 for limiting the amplitude V1, and an inverse polar coordinate converter 103 for converting an output value V1L of the upper limiter 102 and the phase δ output by the polar coordinate converter 101 into voltage values Vd1, Vq1 in the dq coordinates.

The polar coordinate converter 101 obtains the amplitude V1 and the phase δ from Formula (1) using the voltage commands Vd0, Vq0 calculated by the current control unit 5.

[Mathematical Formula 1]

$$\delta = \tan^{-1}\frac{V_{q0}}{V_{d0}} \quad (1)$$
$$V_1 = V_{d0}\cos\delta + V_{q0}\sin\delta$$

The upper limiter 102 outputs V1 obtained by Formula (1) as it is (V1L=V1) when V1 does not exceed a preset limit value V1MAX. Therefore, in this case, the voltage commands Vd1, Vq1 output by the inverse polar coordinate converter 103 are equal to the original voltage commands Vd0, Vq0, respectively. Also, when V1 exceeds V1MAX, the upper limiter 102 limits V1 to V1MAX and outputs it (V1L=V1MAX). In this case, the inverse polar coordinate converter 103 outputs new voltage commands Vd1, Vq1 different from the original voltage commands Vd0, Vq0.

Figure 2:
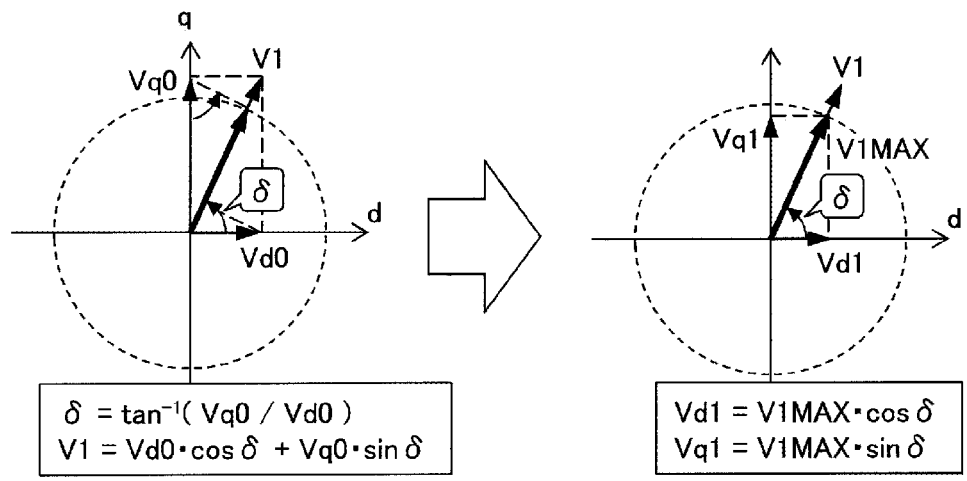
FIG. 2 is a vector diagram showing a calculation operation of a voltage command limiting unit.

FIG. 2 is a vector diagram showing the calculation operation of the voltage limiting unit 10. In FIG. 2, the circle drawn by a broken line is a range that limits the voltage, and the voltage command is limited within this circle. That is, the size of the radius of this edge is equal to the magnitude of the limit value V1MAX.

In the left diagram of FIG. 2, V1 obtained by Formula (1) exceeds the limit V1MAX (V1>V1MAX). In this case, as shown in the right diagram, the amplitude is changed from V1 to V1MAX without changing the phase δ and the voltage commands Vd1 (=V1MAX·cos δ), Vq1 (=V1MAX·sin δ) which are dq-axes components of the vector (V1MAX, δ) are calculated.

Next, the relationship between the voltage limit value and overmodulation will be described.

Figure 3:
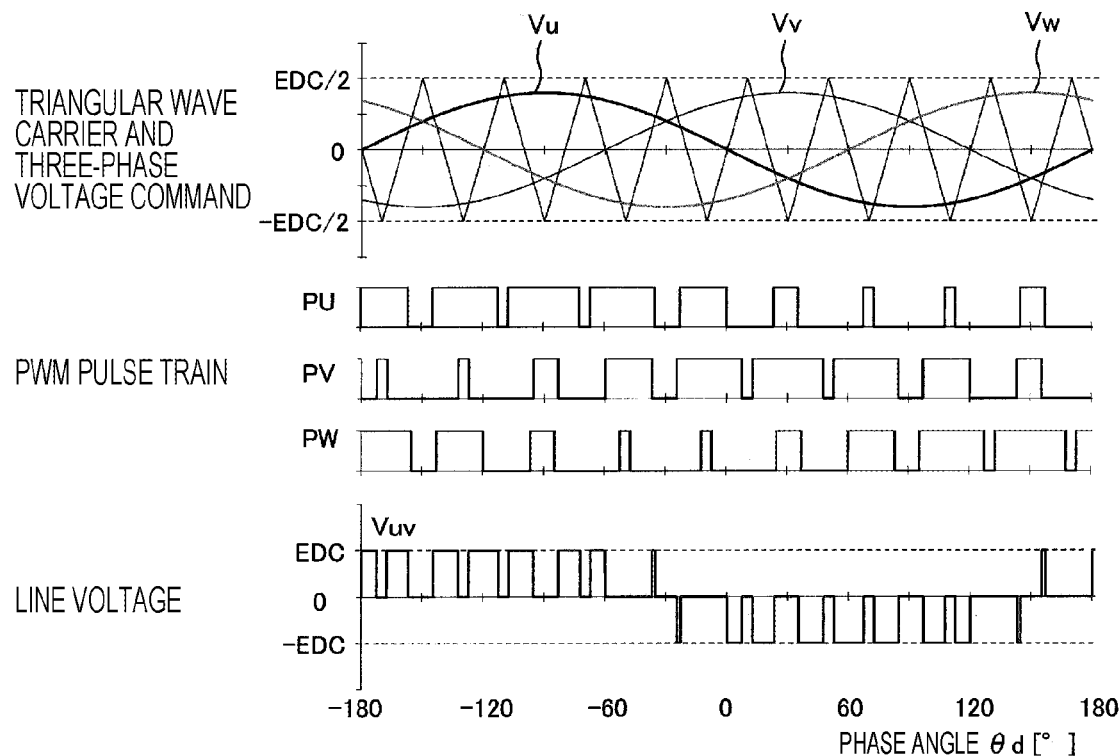
FIG. 3 shows waveforms of the triangular wave carrier and the voltage command, the PWM pulse train, and the line voltage between the U phase and the V phase.
Figure 4:
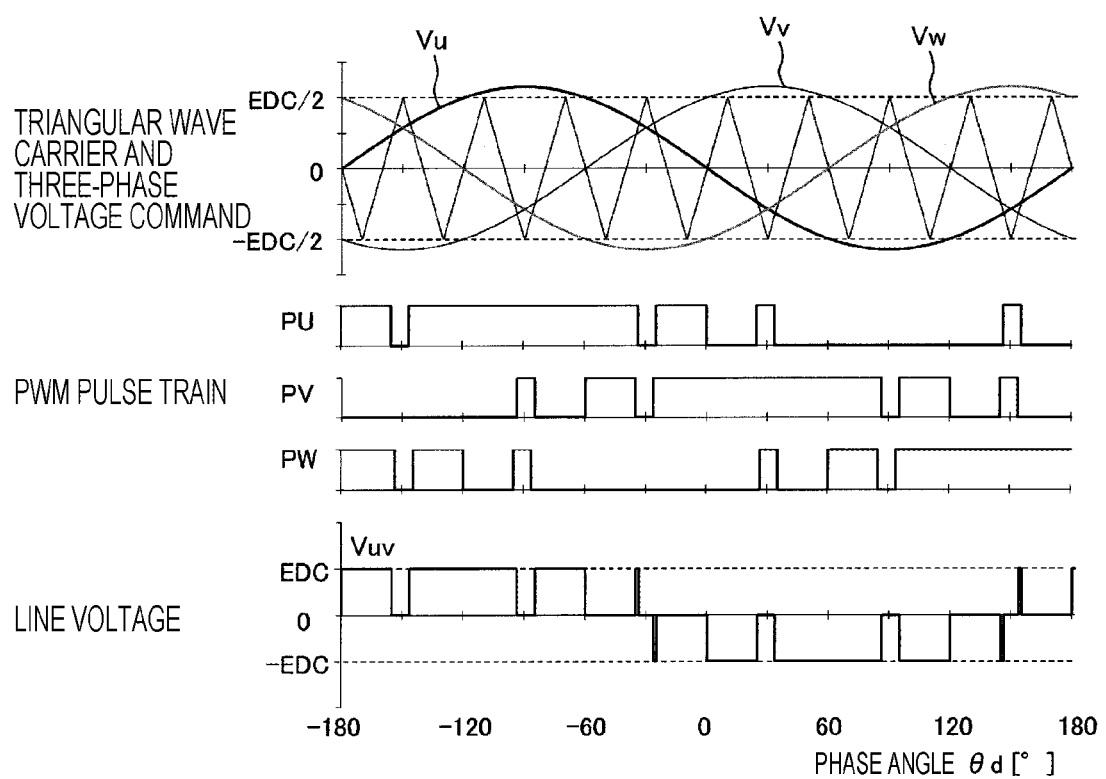
FIG. 4 shows waveforms of the triangular wave carrier and the voltage command, the PWM pulse train, and the line voltage between the U phase and the V phase.

FIGS. 3 and 4 show waveforms of a triangular wave carrier (hereinafter referred to as "carrier") and three-phase voltage commands Vu, Vv, Vw, PWM pulse trains PU, PV, PW generated by pulse width modulation (PWM) based on these, and a line voltage between U phase and V phase. FIG. 3 shows a case of normal PWM control in which the modulation rate (amplitude of the voltage command/amplitude of the carrier wave) is smaller than 1. Further, FIG. 4 shows a case of overmodulation PWM control in which the modulation rate is larger than 1. As can be seen by comparing FIG. 3 and FIG. 4, in the case of overmodulation, in PU, PV, PW, a part of the waveform becomes continuous and the pulse width widens. Therefore, the distortion of the waveform increases, but the fundamental wave component included in the PWM waveform increases, so the output voltage increases.

In the present embodiment, the degree of overmodulation is limited by the limit value V1MAX preset in the voltage limiting unit 10.

Next, the problem at the time of overmodulation operation found by the study of the present inventor and the solution using the limit value V1MAX will be described.

Figure 5:
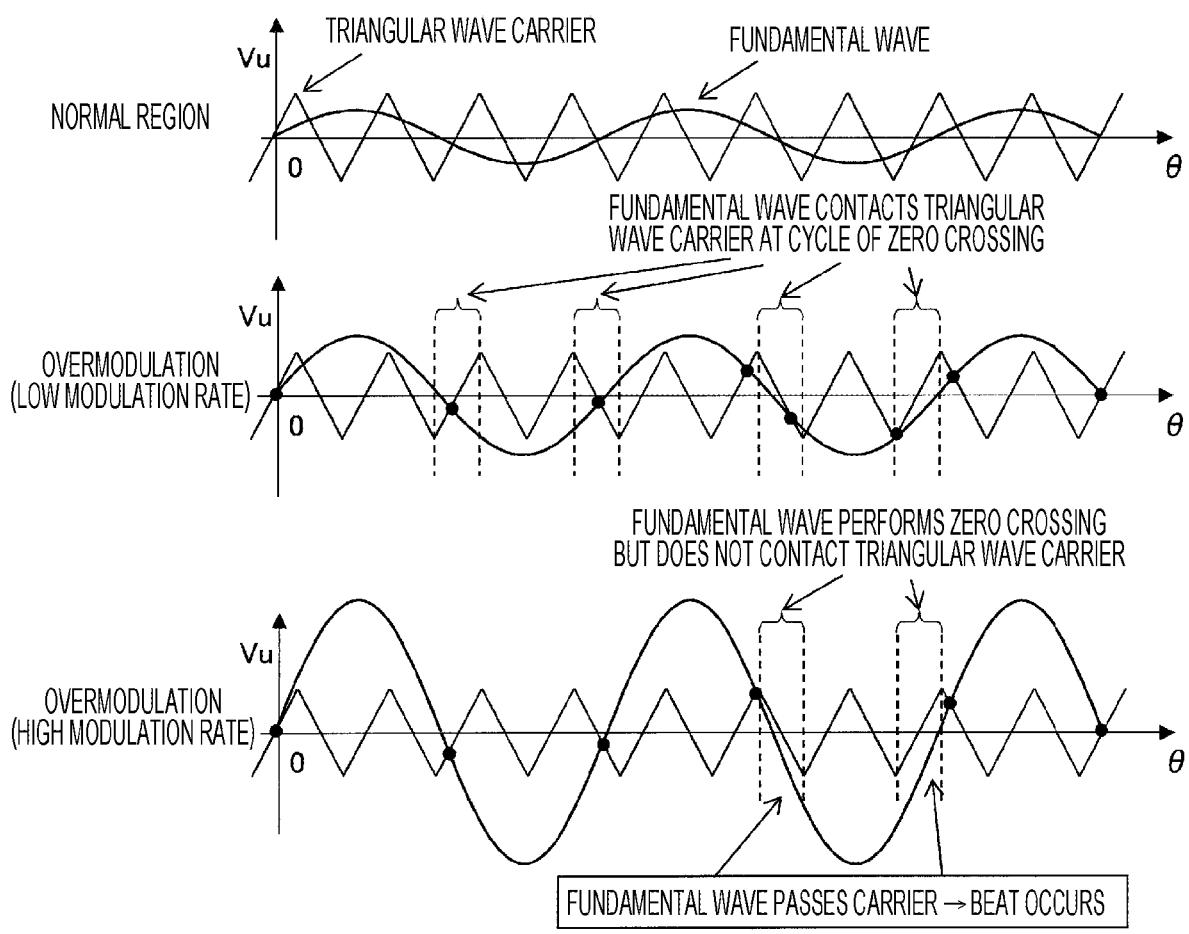
FIG. 5 shows the change in the intersection point of the triangular wave carrier and the fundamental wave.

FIG. 5 shows the change in the intersection point of the triangular wave carrier and the fundamental wave when the amplitude of the voltage command of the fundamental wave is changed with the carrier frequency constant, that is, in the asynchronous PWM control.

As shown in FIG. 5, at the normal operation region (modulation rate<1) (the upper stage in FIG. 5), the intersection point of the fundamental wave and the carrier necessarily exists in a carrier half cycle (between the positive peak and the negative peak), and the sign of the pulse signal switches at that point. Here, switching of the sign of the pulse corresponds to switching from High to Low or switching from Low to High of the PWM pulse train in FIG. 3.

When the modulation rate is gradually increased and the overmodulation range (modulation rate>1) is entered (middle stage in FIG. 5), the number of intersection points of the fundamental wave and the carrier decreases. However, in the carrier half cycle including the zero crossing point of the fundamental wave, the intersection point is obtained. This balances the positive side and the negative side of the PWM pulse waveform. Therefore, although the distortion of the fundamental wave occurs, the unstable output (current/voltage) waveform like the beat phenomenon hardly occurs.

When the modulation rate is further increased (the lower stage in FIG. 5), there is a case where the intersection point of the fundamental wave and the carrier is not generated even in the carrier half cycle including the zero crossing point of the fundamental wave. This is because the gradient of the fundamental wave in the vicinity of the zero crossing point changes more steeply than the gradient of the carrier. The PWM control based on the comparison of the fundamental wave and the carrier is effective under the condition that the fundamental wave changes sufficiently gently with respect to the change of the carrier, and such a condition is satisfied in the normal operation region. However, when the modulation rate becomes excessive, such a condition is not established. As a result, the balance between the positive side and the negative side of the PWM pulse waveform is lost, pulsation (beat) having lower frequency than the fundamental wave occurs in the output (current/voltage) waveform, and the entire control system becomes unstable.

From the study of the problem in overmodulation as described above, in the present embodiment, the overmodulation control is stabilized by means for limiting the degree of overmodulation based on the magnitude relationship between the change rate of the fundamental wave and the change rate of the carrier. Hereinafter, this means will be described.

Figure 6:
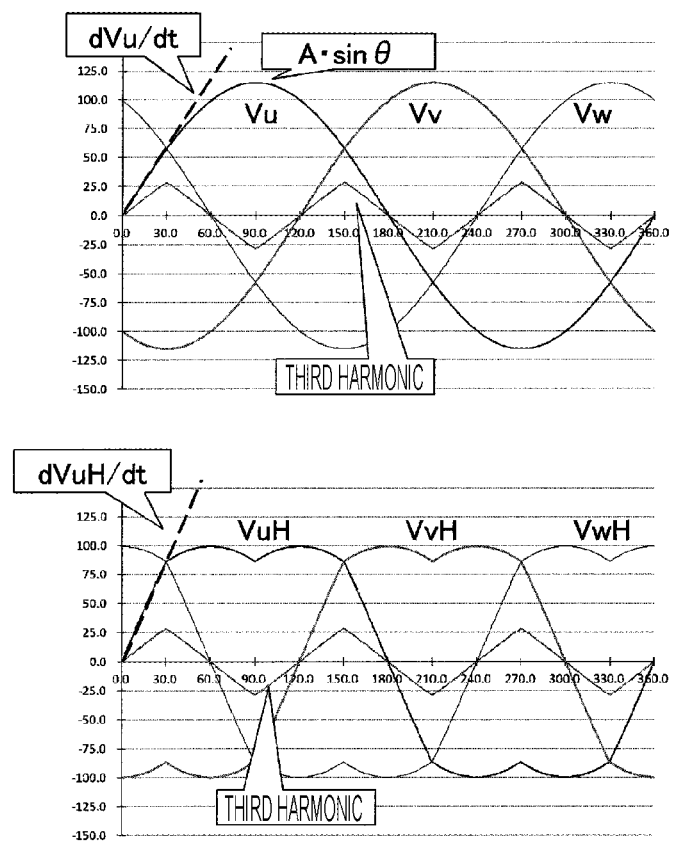
FIG. 6 shows three-phase voltage commands, three-phase voltage commands on which third harmonics are superimposed, and a carrier waveform.
Figure 6:
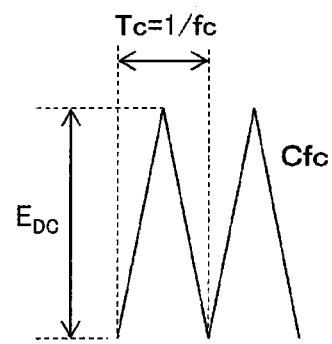

FIG. 6 shows three-phase voltage commands Vu, Vv, Vw, three-phase voltage commands VuH, VvH, VwH on which third harmonics are superimposed, and a carrier waveform in the present embodiment.

When the three-phase voltage commands Vu, Vv, Vw are pure (distortionless) sinusoidal waves, the gradients of Vu, Vv, Vw become steepest at the zero crossing point (upper stage in FIG. 6). First, the U-phase voltage command Vu is expressed by Formula (2).

[Mathematical Formula 2]

$$V_u = \frac{E_{DC}}{2} K_h \cdot \sin(\omega t) \quad (2)$$

Here, EDC is the DC power supply voltage [V], Kh is the modulation rate, and ω is the electrical angular frequency [rad/s].

From Formula (2), the gradient of Vu is expressed by Formula (3).

[Mathematical Formula 3]

$$\frac{d}{dt}V_u = \omega \frac{E_{DC}}{2} K_h \cdot \cos(\omega t) \quad (3)$$

In the present embodiment, in order to improve the voltage utilization factor, the third harmonics are added to Vu, Vv, Vw by the third harmonic adder 12 (FIG. 1) (middle stage in FIG. 6). The third harmonic addition is a known technique. The U-phase voltage command VuH (where ωt is in the range of ±30 degrees) in which the third harmonic is added to the U-phase voltage command Vu expressed by the Formula (2) is expressed by Formula (4).

[Mathematical Formula 4]

$$V_{uH} = \frac{3}{2}\frac{E_{DC}}{2} K_h \cdot \sin(\omega t) \quad (4)$$

From Formula (4), the gradient of VuH is expressed by Formula (5).

[Mathematical Formula 5]

$$\frac{d}{dt}V_{uH}(0) = 2\pi \cdot f_1 \frac{3E_{DC}}{4} K_h \quad (5)$$

Here, f1 is a driving frequency of the PM motor 4, that is, the fundamental frequency [Hz] (ω=2πf1).

From the waveform as shown in FIG. 6 (lower stage), the gradient of the carrier (Cfc) is expressed by Formula (6).

[Mathematical Formula 6]

$$\frac{d}{dt}C_{fc} = \frac{E_{DC}}{\frac{T_c}{2}} = 2 \cdot f_c \cdot E_{DC} \quad (6)$$

Here, Tc is the carrier cycle [sec$^{-1}$], and fc is the carrier frequency [Hz].

From the formulae (5) and (6), the condition that the gradient of the voltage command becomes smaller than the gradient of the carrier is expressed by Formula (7).

[Mathematical Formula 7]

$$2 \cdot f_c \cdot E_{DC} \geq 2\pi \cdot f_1 \frac{3E_{DC}}{4} K_h \quad (7)$$

$$\therefore \frac{4}{3\pi}\frac{f_c}{f_1} \geq K_h$$

As expressed by the Formula (7), the upper limit of the modulation rate Kh, that is, the maximum voltage limit value can be increased as the carrier frequency fc is higher and the fundamental frequency f1 is lower. According to the Formula (7), the limit value KhMAX of Kh is expressed by Formula (8).

[Mathematical Formula 8]

$$K_{hMAX} = \frac{4}{3\pi}\frac{f_c}{f_1} \quad (8)$$

When the third harmonics are not added, KhMAX=(2/π)(fc/f1), but the point that KhMAX is proportional to (fc/f1) is the same.

Figure 7:
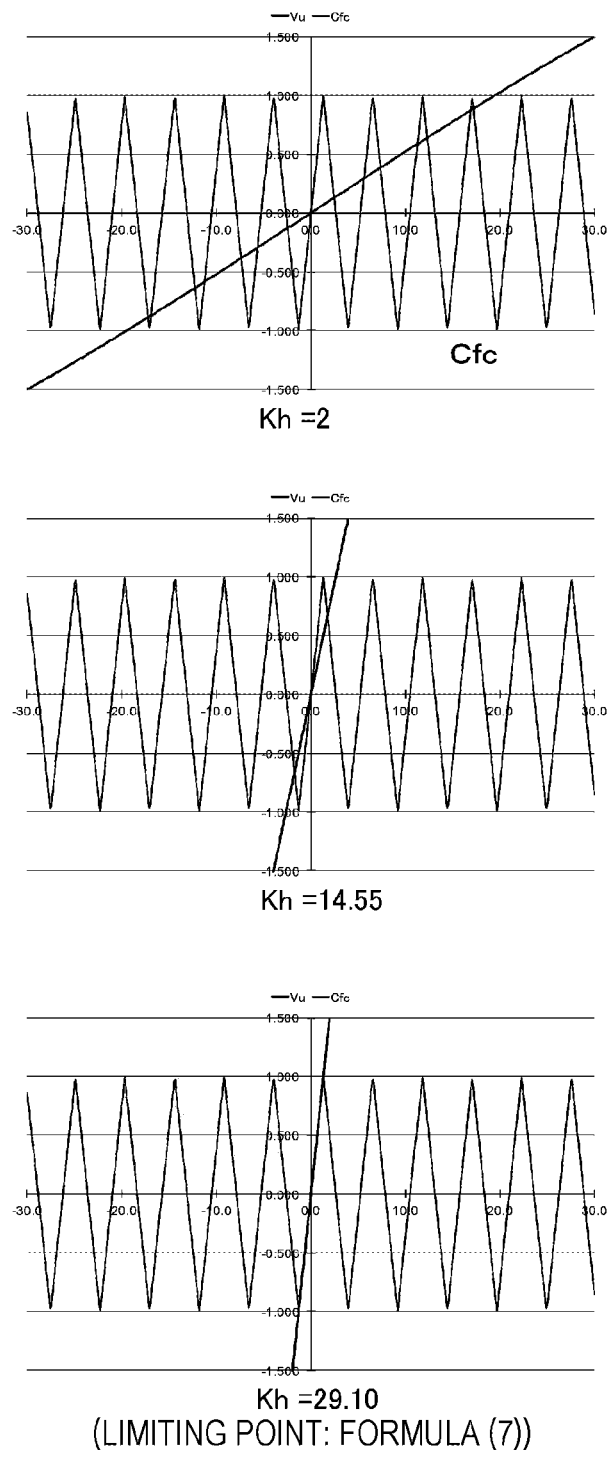
FIG. 7 shows an example of the relationship between gradients of the carrier and the fundamental wave.
Figure 8:
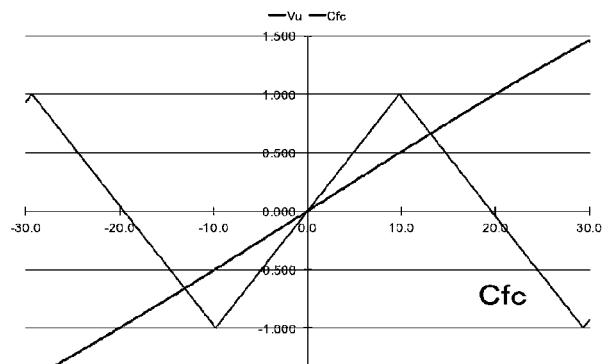
FIG. 8 shows an example of the relationship between gradients of the carrier and the fundamental wave.
Figure 8:
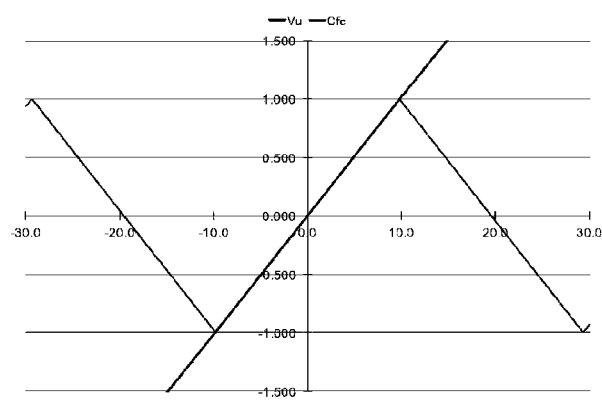
Figure 8:
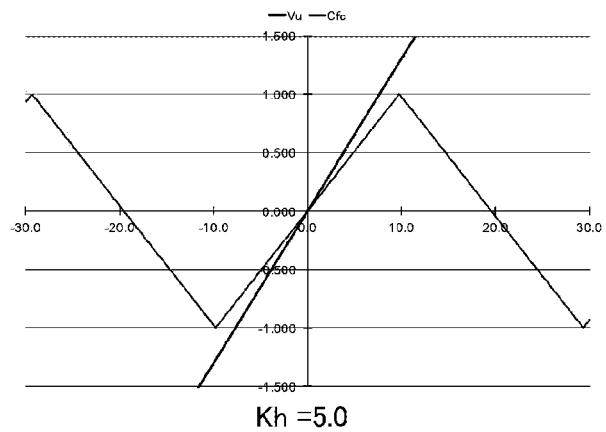

FIGS. 7 and 8 show an example of the relationship between gradients of the carrier and the fundamental wave. In FIG. 7, the carrier frequency fc=12 kHz and the fundamental frequency f1=175 Hz. In FIG. 8, the carrier frequency fc=1.61 kHz and the fundamental frequency f1=175 Hz.

As shown in FIG. 7, the gradient of the fundamental wave increases as the modulation rate Kh increases, and coincides with the gradient of the carrier when Kh=29.1 which is a limiting point of overmodulation indicated by Formula (7).

As shown in FIG. 8, when the carrier frequency is lowered (from 12 kHz to 1.61 kHz) as compared with FIG. 7, the limiting point of overmodulation decreases to Kh=3.90 (in FIG. 7, Kh=29.1 is the limiting point).

Based on the above-mentioned means, the voltage limiting unit 10 (FIG. 1) calculates the limit value KhMAX of the modulation rate according to the Formula (8), based on the carrier frequency fc set by the carrier frequency setting unit (FIG. 1) and the fundamental frequency f1 calculated by the speed and phase calculator 16 (FIG. 1), and sets the limit value V1MAX of the amplitude V1 of the voltage command so that the modulation rate Kh is equal to or less than the limit value KhMAX.

The relationship between V1MAX and KhMAX is expressed by Formula (9).

[Mathematical Formula 9]

$$V_{1MAXc} = K_{hMAX} \frac{E_{DC}}{\sqrt{3}} \tag{9}$$

The Formula (9) is a case where the third harmonic addition is used, and relative conversion is used for dq conversion. Therefore, by limiting the magnitude of the voltage command based on the Formula (8) or (9), stable overmodulation control can be achieved even with asynchronous PWM control. Therefore, troubles such as increase of electromagnetic noise and current ripple due to change of carrier frequency in synchronous PWM control hardly occur. Also, since the carrier frequency can be made constant even in the overmodulation range, highly responsive control can be realized in both the overmodulation range and the normal region.

As described above, according to the first embodiment of the present invention, high controllability and low noise characteristics are obtained in the overmodulation control of the control device of the AC motor.

Second Embodiment

Figure 9:
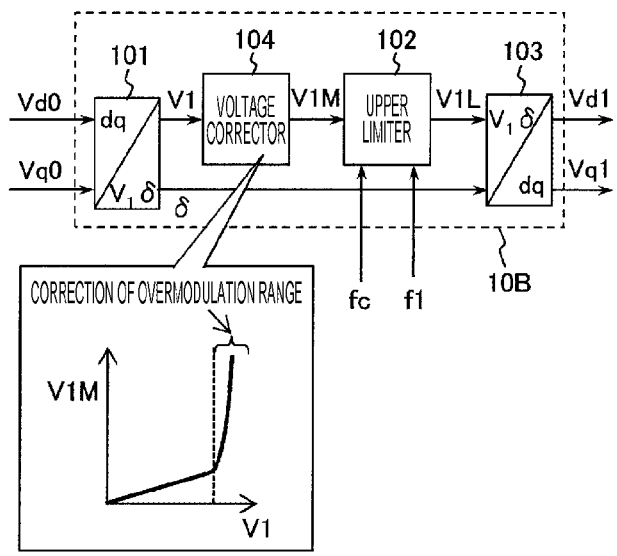
FIG. 9 shows a configuration of a voltage limiting unit of a control device for an AC motor according to a second embodiment.

FIG. 9 shows a configuration of a voltage limiting unit 10B of a control device for an AC motor according to the second embodiment of the present invention. The voltage limiting unit 10B has a different configuration from the voltage limiting unit 10 of FIG. 1. The configuration other than the voltage limiting unit 10B is similar to that of the first embodiment shown in FIG. 1. Hereinafter, points different from the first embodiment will be described.

As shown in FIG. 9, the voltage limiting unit 10B includes a voltage corrector 104 that performs voltage correction on the voltage command amplitude V1 which is the output of the polar coordinate converter 101. The voltage corrector 104 corrects V1 based on the nonlinearity in the relationship between the voltage command amplitude (V1) in the overmodulation range and the output voltage of the inverter 3, that is, the voltage (V1M) actually applied to the motor. The voltage corrector 104 performs correction using a predetermined table or equation expressing the relationship between V1 and V1M.

According to the second embodiment, as in the first embodiment, high controllability and low noise characteristics are obtained in the overmodulation control of the control device of the AC motor. Furthermore, since the error between the voltage command amplitude in the overmodulation range and the inverter output voltage is reduced by the above-described voltage corrector 104, overmodulation control with high precision becomes possible.

Third Embodiment

Figure 10:
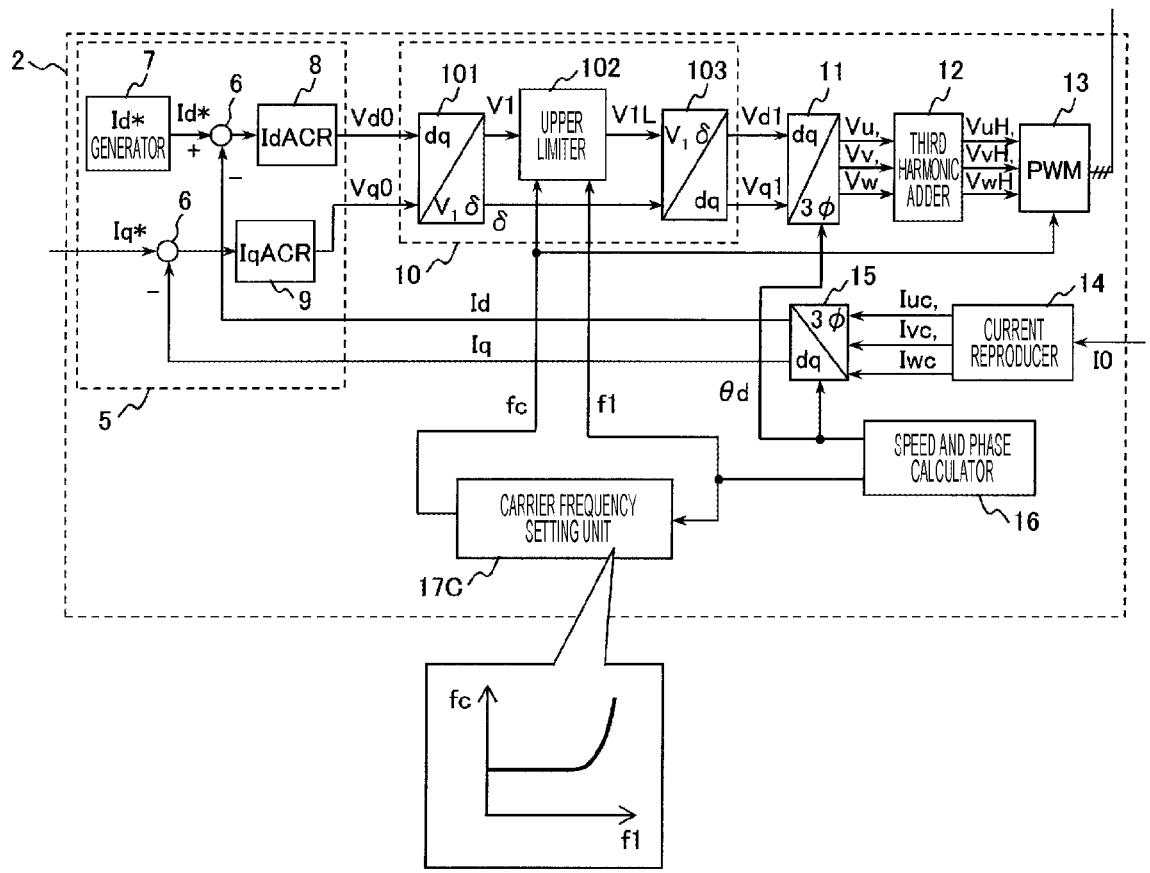
FIG. 10 shows a configuration of a controller of a control device for an AC motor according to a third embodiment.

FIG. 10 shows a configuration of a controller 2 of a control device for an AC motor according to the third embodiment of the present invention. This controller 2 has a partially different configuration from the controller 2 of FIG. 1. The configuration other than the controller 2 is the same as that of the first embodiment shown in FIG. 1. Hereinafter, points different from the first embodiment will be described.

As shown in FIG. 10, the controller 2 includes a carrier frequency setting unit 17C that changes and sets the carrier frequency fc based on the driving frequency of the PM motor 4 (FIG. 1), that is, the fundamental frequency f1. It should be noted that the voltage corrector 104 changes and sets fc by using a predetermined table or equation expressing the relationship between f1 and fc.

The carrier frequency setting unit 17C fixes the carrier frequency fc at a constant value within a range in which the fundamental frequency f1 is low and does not substantially reach the upper limit of the overmodulation, and sets the carrier frequency fc to be higher than the constant value within a range in which f1 becomes higher than the predetermined value and may reach the upper limit of the overmodulation. According to the above-described Formula (8), as the fundamental frequency f1 increases, the limit value (upper limit value) of the modulation rate decreases. Accordingly, as the fundamental frequency f1 increases, the upper limit value of the modulation rate can be maintained at a desired magnitude by increasing the carrier frequency fc.

As can be seen from the comparison of above-described FIGS. 3 and 4, in the overmodulation range, since the number of switching times of the semiconductor switching elements constituting the inverter main circuit decreases, even if the carrier frequency is increased, increase in the power loss of the inverter can be suppressed.

According to the third embodiment, as in the first embodiment, high controllability and low noise characteristics are obtained in the overmodulation control of the control device of the AC motor. Further, even if the fundamental frequency f1 is increased or decreased by the above-described carrier frequency setting unit 17C, it is possible to secure a desired modulation rate in the overmodulation control.

It is to be noted that the above-described carrier frequency setting unit 17C may be applied to the second embodiment. Also in this case, the above-described effect can be obtained.

Fourth Embodiment

In the first to third embodiments described above, the overmodulation control is stabilized by limiting the amplitude of the voltage command. At this time, the current control system may cause hunting. For example, when the voltage applied to the motor by the inverter is insufficient with respect to the induced voltage of the motor, a negative excitation current is generated. The current controller (especially the d-axis current controller) operates to control the negative excitation current to zero. However, if the amplitude of the voltage command is limited by the limit value at this time, an integral value is accumulated in an integral term of the PI control (proportional integral controller) in the current controller, and thus there is a possibility of causing hunting.

On the other hand, it is conceivable to apply means for stopping the integral current control by causing the integral term of the integral current control system to converge to zero as shown in the above-described PTL 3. However, when the amplitude of the voltage command is close to the voltage limit value, since the amplitude of the voltage command is limited or not limited to the voltage limit value, the control system may not be stabilized. On the other hand, regardless of the presence or absence of voltage limitation, the control system is more stabilized by continuous control of current by one means.

Therefore, in the fourth embodiment, the current control is stabilized by adjusting the gain of the current controller as described below.

Figure 11:
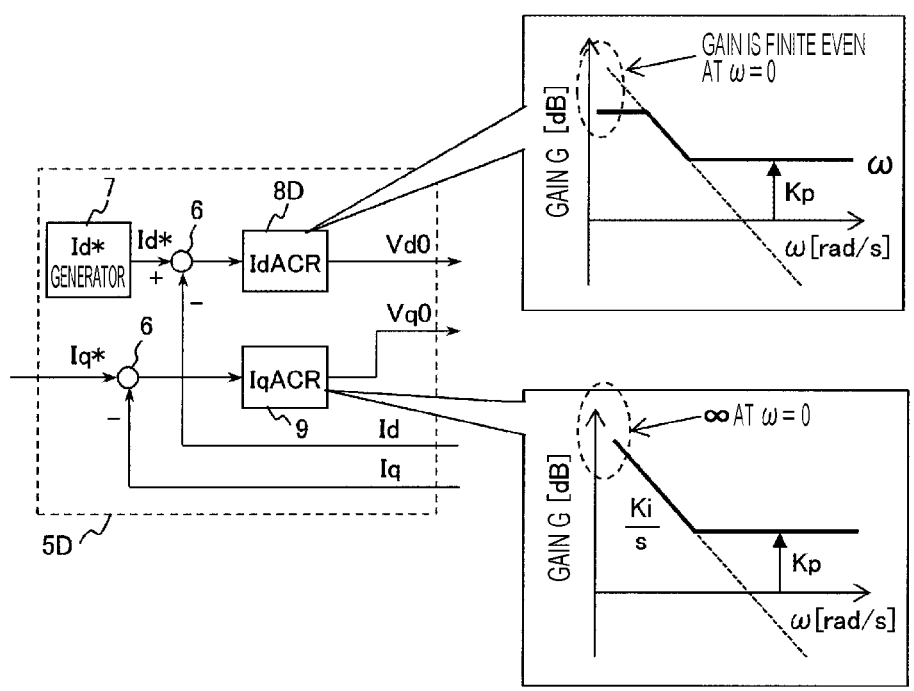
FIG. 11 shows a configuration of a current control unit of a control device for an AC motor according to a fourth embodiment.

FIG. 11 shows a configuration of a current control unit 5D of a control device for an AC motor according to the fourth embodiment of the present invention. The current control unit 5D has a configuration different from that of the current control unit 5 of FIG. 1. The configuration other than the current control unit 5D is the same as that of the first embodiment. Hereinafter, points different from the first embodiment will be described.

As shown in FIG. 11, in this embodiment, a normal PI controller is applied to the q-axis current controller 9 which is a torque current controller, and to the d-axis current controller 8D which is an excitation current controller, unlike the normal PI controller, a controller having a frequency characteristic in which the DC gain is finite is applied.

As a normal current controller, a PI controller whose DC gain is infinite is applied in order to make the steady error zero. However, there is a possibility that the hunting described above may occur when the voltage limitation is executed. Therefore, in the present embodiment, the DC gain of the d-axis current controller 8D is made finite and a steady-state deviation is left. Although the steady-state deviation remains, the value can be set appropriately by adjusting the value of DC gain ($\omega=0$).

Here, in the present embodiment, in order to prioritize the torque control in the overmodulation range, in the q-axis current control, the torque current deviation is controlled to zero by the normal PI control. On the other hand, deviation remains in the d-axis current control, but since the DC gain is finite, hunting is suppressed and the control system can be stabilized.

According to the fourth embodiment, in the overmodulation control of the control device of the AC motor, high controllability and low noise characteristics are obtained as in the first embodiment. Furthermore, even if the execution and release of the voltage limitation are repeated by the above-described current control unit 5D, the control system can be stabilized. In addition, the same current controller can perform stable control in both the normal region and the overmodulation region.

Note that the above-described current control unit 5D can be applied to any of the first to third embodiments, and in any case, the above-described effect can be obtained.

Fifth Embodiment

Figure 12:
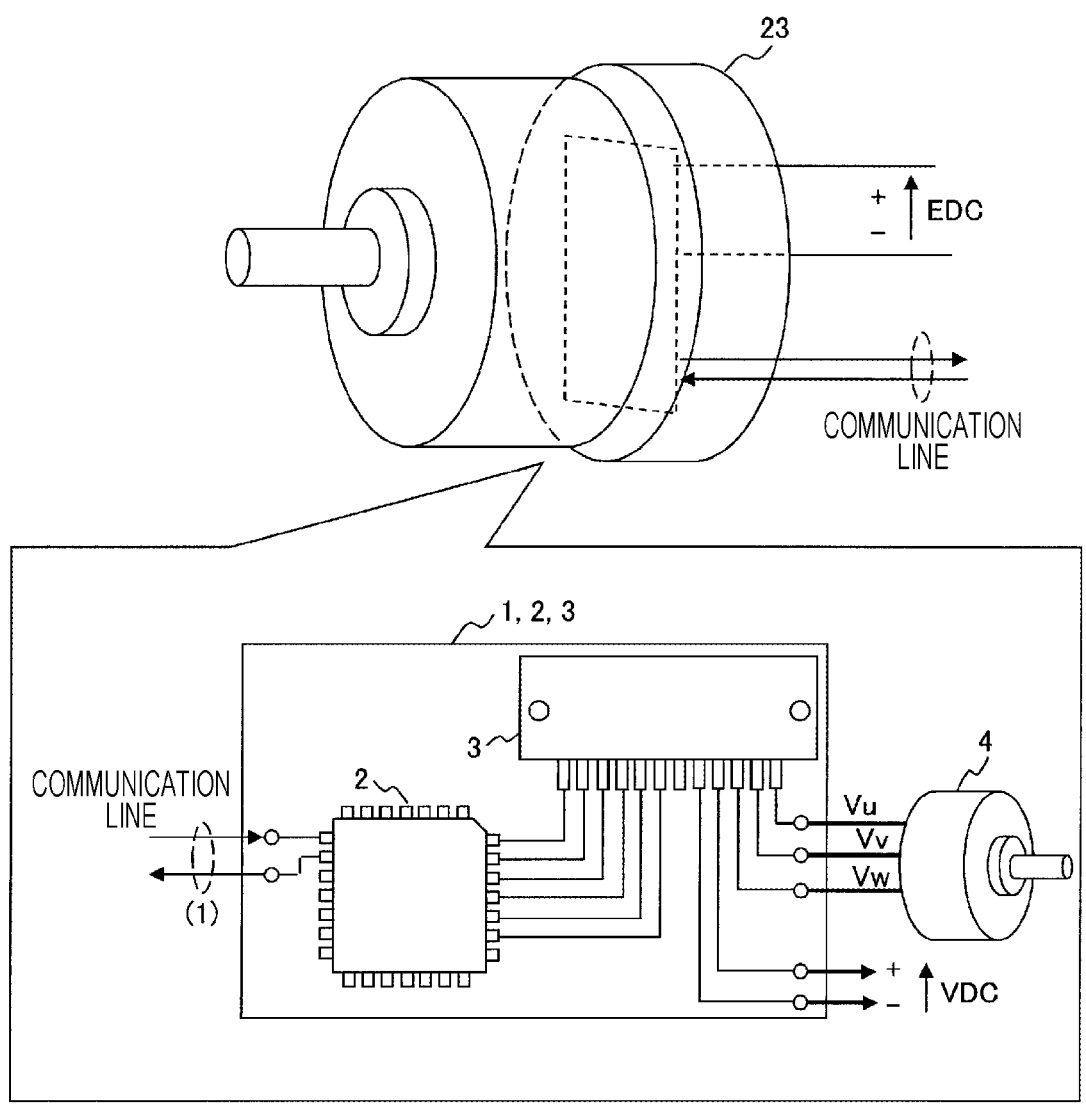
FIG. 12 shows a schematic configuration of an AC motor drive system according to a fifth embodiment.

FIG. 12 shows a schematic configuration of an AC motor drive system according to the fifth embodiment of the present invention.

As shown in FIG. 12, an AC motor drive system 23 includes a PM motor 4 for driving a load (not shown) (for example, see the sixth and seventh embodiments described later), and an inverter 3 and a controller 2 housed in a casing of the PM motor for storing a rotor and a stator. The PM motor 4, the inverter 3 and the controller 2 are constituted by any one of the control devices of the AC motors of the first to fourth embodiments.

In the present embodiment, the inverter 3 and the controller 2 are constituted by integrated circuits and are mounted on the same substrate. This substrate is housed in the casing of the PM motor 4.

The output terminal of the inverter 3 located on the substrate and the three-phase AC terminals of the motor 4 are electrically connected by wiring in the casing of the PM motor 4. As a result, three-phase AC voltages (Vu, Vv, Vw) are applied to the PM motor 4 from the inverter 3. A DC terminal for connecting the inverter 3 to the DC power supply and a terminal for connecting the controller 2 and the communication line used for communication with the outside are provided on the substrate, and are connected with the DC power supply line and the communication line, respectively. The DC power supply line and the communication line are taken outside the PM motor 4.

According to the fifth embodiment, if the motor is connected to the DC power supply and the torque current command Iq* is given to the motor from the outside through the communication line, it is possible to drive the motor by the overmodulation control having high controllability and low noise characteristics. Also, since the motor current can be reduced by positively using the overmodulation range, the heat generation amount of the motor is reduced and the motor can be miniaturized.

In addition, since the motor and the control device thereof are integrated, so to speak, a single motor constitutes the AC motor drive system, the AC motor drive system can be downsized.

Sixth Embodiment

Figure 13:
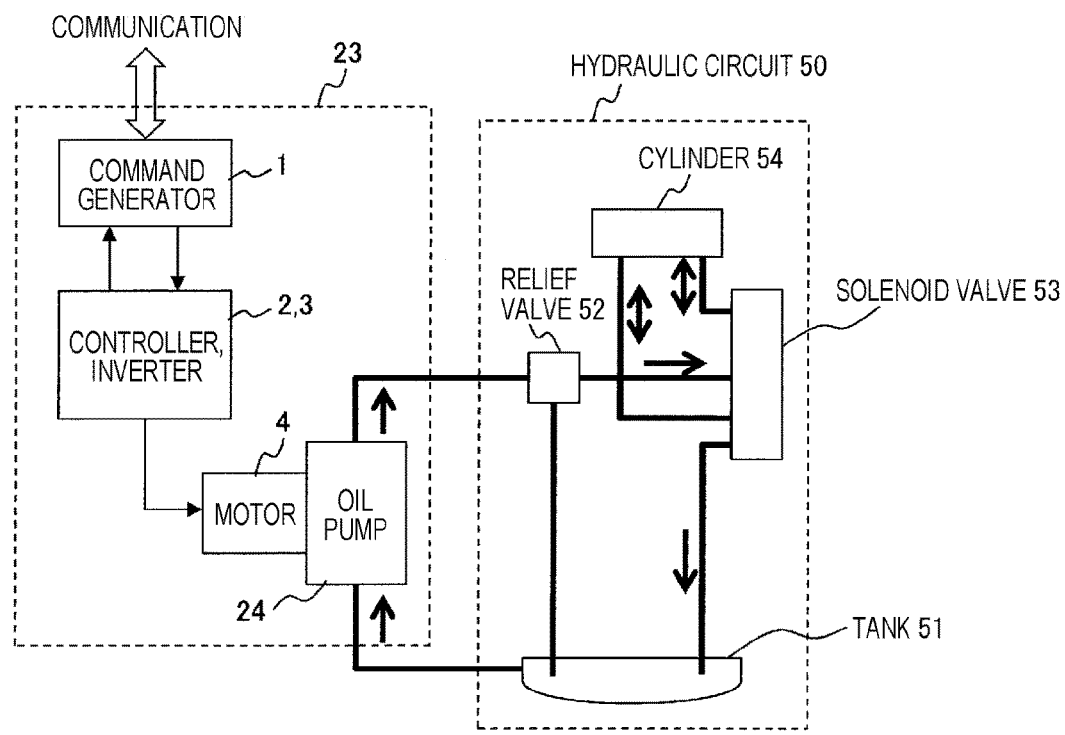
FIG. 13 shows a configuration of a hydraulic drive system according to a sixth embodiment.

FIG. 13 shows a configuration of a hydraulic drive system according to the sixth embodiment of the present invention. This hydraulic drive system is used for transmission hydraulic pressure, brake hydraulic pressure and the like inside the automobile.

In the present embodiment, in order to drive an oil pump 24 by the PM motor 4, the AC motor drive system 23 (FIG. 12) according to the above-described fifth embodiment is applied. The hydraulic pressure of a hydraulic circuit 50 is controlled by the oil pump 24. The hydraulic circuit 50 is provided with a tank 51 for storing oil, a relief valve 52 for keeping the oil pressure below the set value, a solenoid valve 53 for switching the hydraulic circuit, and a cylinder 54 for operating as a hydraulic actuator.

The oil pump 24 is driven by the AC motor drive system 23 to generate hydraulic pressure and drives the cylinder 54. In the hydraulic circuit 50, as the circuit is switched by the solenoid valve 53, the load of the oil pump 24 is changed, and load disturbance occurs in the AC motor drive system 23. In the hydraulic circuit 50, a load several times or more may be applied to the steady state pressure. On the other hand, according to the present embodiment, by effectively utilizing overmodulation, it is possible to increase the output of the motor, and a robust hydraulic drive system capable of reliably continuing the control of the hydraulic pressure even under a large load fluctuation can be obtained.

In the present embodiment, the AC motor drive system 23 is applied to drive the oil pump, but the present invention is not limited to this, and the AC motor drive system 23 can also be applied to drive other liquid pumps such as a water pump.

Seventh Embodiment

Figure 14:
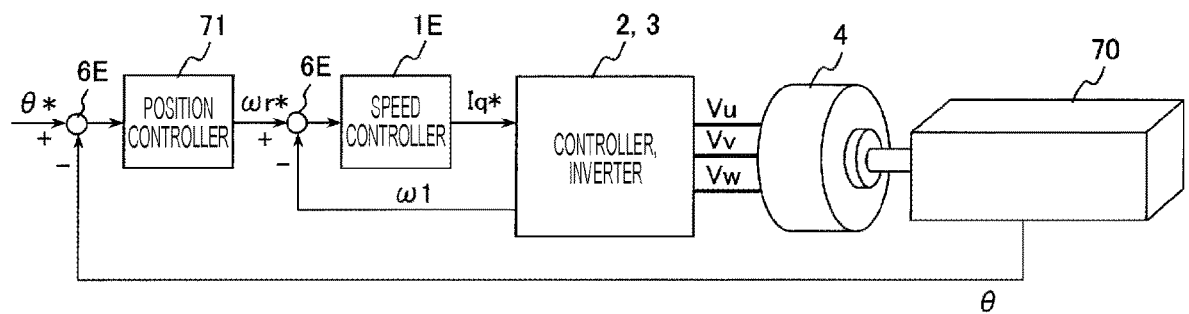
FIG. 14 is a block diagram showing a configuration of a positioning device and a drive device thereof according to a seventh embodiment.

FIG. 14 is a block diagram showing a configuration of a positioning device and a drive device thereof according to the seventh embodiment of the present invention.

As shown in FIG. 14, the positioning device 70 is mechanically connected to the PM motor 4 as a load and driven by the PM motor 4. The positioning device 70 is a position setting device for an object whose position moves using a ball screw or the like, for example, and the setting position θ is controlled so as to match the position command θ*. As the drive device of the positioning device 70, any one of the control devices of the AC motors of the first to fourth embodiments is applied.

In the present embodiment, the torque current command Iq* is created by the speed controller 1E. The speed controller 1E calculates Iq* so that the deviation between the speed command ωr* calculated by a subtracter 6E and the motor speed ω1 detected or estimated by the controller 2 approaches zero. The speed command ωr* is created by the position controller 71, which is a higher-level control device. The position controller calculates the speed command ωr* so that the deviation between the position command θ* calculated by the subtracter 6E and the position θ set by the positioning device 70 becomes zero.

According to the present embodiment, since it is possible to effectively utilize the overmodulation range, higher response positioning control can be realized. In addition, since the occurrence of instability phenomena during overmodulation is suppressed, the operation of the positioning device is stabilized and the noise can be reduced.

The seventh embodiment described above may be applied to position control of elevator cars and the like.

It should be noted that the present invention is not limited to the above-described embodiments, but includes various modified examples. For example, the above-described embodiments have been described in detail in order to explain the present invention in an easy-to-understand manner, and are not necessarily limited to those having all the described configurations. Further, other components may be added to, deleted from, or replace a part of the configuration of each embodiment.

For example, in the above embodiment, the synchronous PWM control may be applied. In addition to a MOSFET, an Insulated Gate Bipolar Transistor (IGBT) or the like may be applied as the semiconductor switching element constituting the inverter circuit.

Further, the application range of the control device of the AC motor is not limited to the above-mentioned pump (hydraulic pump, water pump) and positioning device, but also various kinds such as a compressor, a spindle motor, an air conditioner, a conveyor, an elevator, an extruder, or a machine tool.

REFERENCE SIGNS LIST

1 Iq* generator
1E speed controller
2 controller
3 inverter
4 PM motor
5, 5D current control unit
6 adder
6E subtractor
7 Id* generator
8, 8D d-axis current controller
9 q-axis current controller
10, 10B voltage limiting unit
11 dq inverse converter
12 third harmonic adder
13 pulse width modulator
17 current reproducer
15 dq converter
16 speed and phase calculator
17 carrier frequency setting unit
17C carrier frequency setting unit
23 AC motor drive system
24 oil pump
31 DC power supply
32 inverter main circuit
33 gate driver
34 current detector
50 hydraulic circuit
51 tank
52 relief valve
53 solenoid valve
54 cylinder
70 positioning device
71 position controller
101 polar coordinate converter
102 upper limiter
103 inverse polar coordinate converter
104 voltage corrector

The invention claimed is:

1. A control device for an AC motor comprising:
an inverter for driving an AC motor; and
a controller for controlling the inverter by pulse width modulation,
wherein the controller limits an amplitude of a voltage command in the pulse width modulation to a predetermined upper limit value or less when performing overmodulation control of the inverter, and
wherein the controller corrects the amplitude of the voltage command based on a nonlinear relationship between the amplitude of the voltage command and an output voltage of the inverter in the overmodulation control.

2. The control device for an AC motor according to claim 1, wherein the predetermined upper limit value is set according to at least one of a carrier frequency in the pulse width modulation and a driving frequency of the AC motor.

3. The control device for an AC motor according to claim 1, wherein
a carrier frequency in the pulse width modulation is made constant, and
the predetermined upper limit value is set according to a driving frequency of the AC motor.

4. The control device for an AC motor according to claim 1, wherein when the amplitude of the voltage command is the upper limit value, a gradient at a zero crossing point of the voltage command is equal to a gradient of a carrier in the pulse width modulation.

5. The control device for an AC motor according to claim 1, wherein a relationship between a modulation rate Kh, a carrier frequency fc of the pulse width modulation, and a driving frequency f1 of the AC motor is expressed by Formula (1).

[Mathematical Formula 1]

$$K_h \leq \frac{4}{3\pi} \frac{f_c}{f_1} \quad (1)$$

6. The control device for an AC motor according to claim 1, wherein the controller sets a carrier frequency in the pulse width modulation to a constant value until a driving frequency of the AC motor reaches a predetermined value, and when the driving frequency of the AC motor exceeds the predetermined value, increases the carrier frequency above the constant value.

7. The control device for an AC motor according to claim 1,
   wherein the controller includes:
   a torque current controller for controlling a torque component of an output current of the inverter; and
   an excitation current controller for controlling an excitation component of an output current of the inverter, and
   wherein a DC gain of the excitation current controller is finite.

8. A control method for an AC motor which controls an inverter that drives the AC motor by pulse width modulation, the control method comprising:
   limiting an amplitude of a voltage command in the pulse width modulation to a predetermined upper limit value or less when performing overmodulation control of the inverter: and
   correcting the amplitude of the voltage command based on a nonlinear relationship between the amplitude of the voltage command and an output voltage of the inverter in the overmodulation control.

9. An AC motor drive system comprising:
   an AC motor for driving a load;
   an inverter for driving the AC motor; and
   a controller for controlling the inverter by pulse width modulation,
   wherein the controller limits an amplitude of a voltage command in the pulse width modulation to a predetermined upper limit value or less when performing overmodulation control of the inverter, and
   wherein the controller corrects the amplitude of the voltage command based on a nonlinear relationship between the amplitude of the voltage command and an output voltage of the inverter in the overmodulation control.

10. The AC motor drive system according to claim 9, wherein the inverter and the controller are housed in a casing of the AC motor.

11. The AC motor drive system according to claim 9, wherein the load is a liquid pump.

12. The AC motor drive system according to claim 9, wherein the load is a moving object and the controller controls a position of the moving object.

* * * * *